United States Patent Office 3,356,662
Patented Dec. 5, 1967

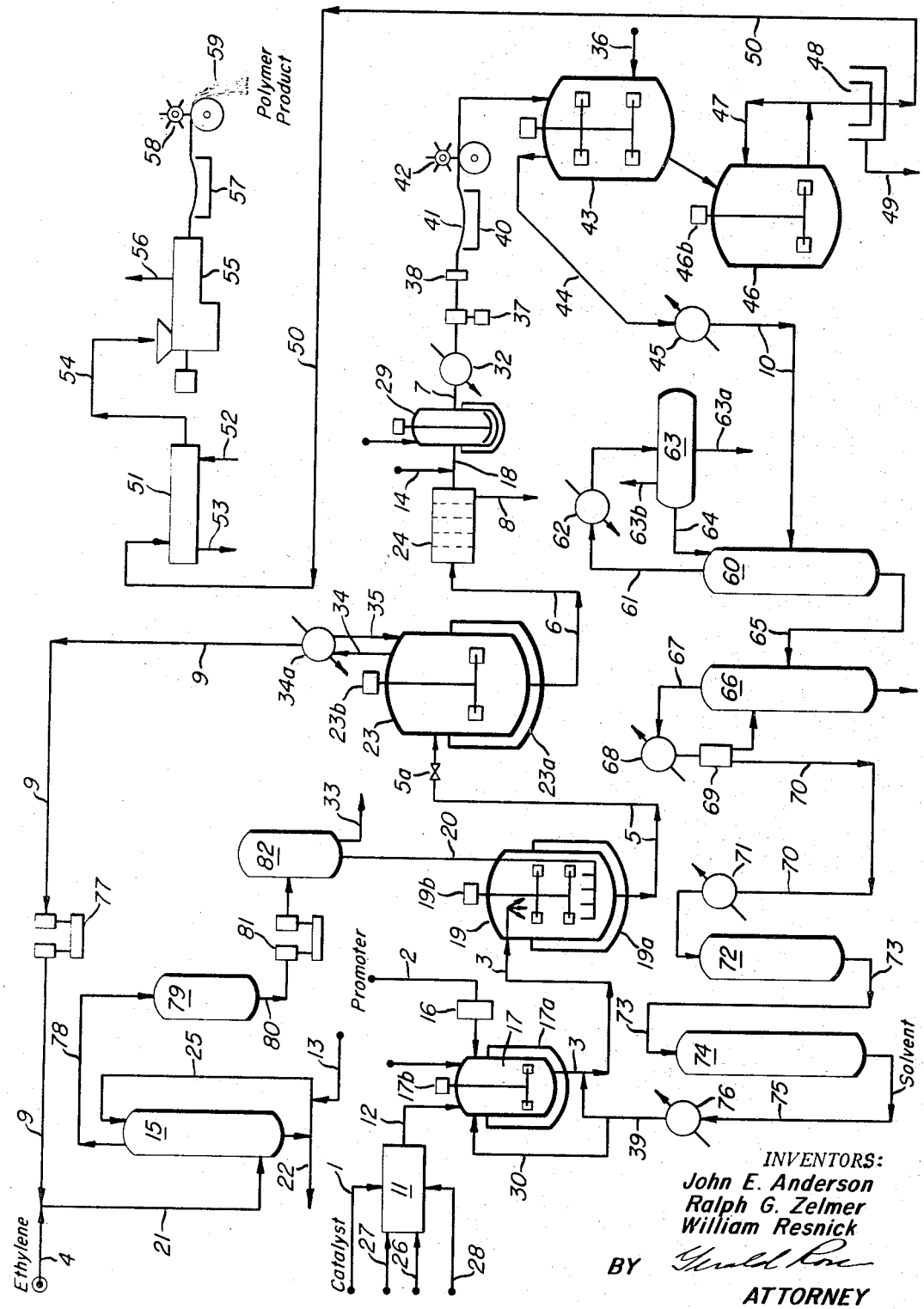

3,356,662
PREPARATION OF HIGH QUALITY SOLID OLEFIN POLYMERS
John E. Anderson, Oakland, N.J., Ralph G. Zelmer, Oaklawn, Ill., and William Resnick, Haifa, Israel, assignors to Standard Oil Company, Chicago, Ill., a corporation of Indiana
Filed May 5, 1964, Ser. No. 369,049
8 Claims. (Cl. 260—88.2)

This invention relates to the preparation of normally solid polymers from 1-alkene monomers, and more particularly relates to an improved process for obtaining commercial quality solid olefin polymers from the crude polymer obtained as an initial product in a polymerization reaction medium. This application is a continuation-in-part of copending application Ser. No. 822,866, filed June 25, 1959.

It is known that normally liquid or gaseous 1-alkenes can be polymerized to tough resinous normally solid polymers by means of various solid catalysts, especially those of the transition heavy metal type. The polymerization reaction is ordinarily conducted in the presence of an inert liquid hydrocarbon reaction medium at sufficiently high temperature to produce the normally solid olefin polymer as a solution in the reaction medium and excess 1-alkene monomer. Polymerization processes of this general type are in wide use, and have recently received extensive development and commercialization.

The reaction mixture at the conclusion of polymerization is a mixture of normally gaseous materials (1-alkene monomer), normally liquid materials (hydrocarbon reaction medium) and at least two normally solid components (catalyst, promoter, if any, and olefin polymer). Heretofore, the resolution of this reaction mixture and the recovery of polymer in commercial purity have been serious obstacles to commercial utilization of the new polymerization catalysts. These obstacles have been overcome only by resorting to elaborate and expensive flow schemes, which have materially affected the price and availability of solid olefin polymers. In U.S. 3,010,948—Field et al., patented Nov. 28, 1961, it is suggested that such methods as steam distillation, gas stripping, vacuum extrusion, etc., may be used for recovery of solid polymer from a polymer-solvent mixture. And in U.S. 2,964,513—G. H. Dale, patented Aug. 20, 1956, there is disclosed a polymer-solvent separation by spraying a polymer-solvent mixture into super-heated steam. This latter method produces polymer of low solvent content; however, there is a requirement in such method that spraying be effected into superheated steam in a narrow temperature range of from above the polymer melting point to below the polymer fluidization point. For polyethylene, this is a temperature range of about 15° F. If the proper temperature range is not maintained, the polymer is obtained as either a light, fluffy material, difficult to handle, or as a liquid.

Accordingly, a primary object of the present invention is to provide a process for preparing high quality normally solid olefin polymers using the new solid catalysts wherein the polymer product is recovered in excellent purity without resorting to many of the expensive and elaborate prior art expedients. A further object is to provide an improved commercial 1-alkene polymerization and recovery process wherein the investment and operating costs and problems are relatively low. Yet another object is to provide an improved method for recovering and utilizing the several components of a polymerization reaction mixture. An additional object is to improve the separation and recycle system of commercial polymerization units. Other and more particular objects will be apparent as the detailed description of the invention proceeds.

Briefly, in accordance with the invention, a 1-alkene monomer is first polymerized in the presence of a solid polymerization catalyst and in the presence of a substantially inert liquid hydrocarbon reaction medium, under conditions effective to produce the polymer as a solution in a solvent comprising the reaction medium and excess 1-alkene monomer. The polymerization effluent then passes to a low pressure flash drum wherein most of the excess monomer, together with a minor amount of reaction medium, is flashed off as vapor. The flash drum bottoms material, comprising most of the reaction medium and all of the polymer and catalyst, is treated for physical separation of the solid catalyst particles by such non-chemical means as filtration or centrifugation, and the polymer-reaction medium mixture is then extruded, to increase its surface area, and pelletized to facilitate further processing. The pelleted extrudate is next steam stripped, preferably at reduced pressure, to remove residual hydrocarbon reaction medium and some deleterious materials. The polymer may further be processed by drying and re-extruding to obtain strands or pellets, which last are the usual form for commercially salable polymer product.

Excess 1-alkene monomer which is initially flashed as a vapor from the polymerization reaction mixture may be recycled to the polymerization process. A portion of the recycle gas may be purged to maintain methane and ethane inerts at a low level. Since, however, recycle ethylene gas contains minor amounts of certain contaminants, it is desirably caustic scrubbed and dried before re-introduction along with fresh 1-alkene feed.

Similarly, the substantially inert liquid hydrocarbon reaction medium or solvent that is steam stripped from the polymer contains, inter alia, high boiling alkylate as well as various other materials which would be harmful to the polymerization reaction medium. This solvent is preferably processed by first distilling it to obtain a heart cut, drying the heart cut by passage through a molecular sieve material (calcium aluminosilicate) having about a 5 Angstroms pore diameter, and then passing the dried heart cut through a silica gel bed to remove chemical contaminants. If desired, the order of adsorption treatment can be reversed.

The invention will be described in more detail with reference to the attached figure showing, in schematic form, a flowsheet of a commercial plant embodying the instant olefin purification process. For simplicity and clarity, many auxiliaries such as duplicate equipment, utilities, pumps, gauges, heat exchangers, coolers and the like, have been eliminated. The need and location of these auxiliaries are, however, apparent to those skilled in the chemical processing art.

Referring to the drawing, 1-alkene polymerization is effected in reactor 19, excess alkene monomer is flashed in flash drum 23, solid catalyst is separated in filter 24, and the melt is extruded through solution die 38 into cooling trough 40, and then chopped in chopper 42 and steam stripped in batch still 43. The majority of the water retained on the stripped polymer is removed by centrifuge 48 and hot air dryer 51. Final drying or devolatilization is carried out in extruder 55.

Normally solid olefin polymers may be obtained by polymerizing 1-alkene hydrocarbon monomers having the formula $RHC:CH_2$, where R is hydrogen or an alkyl group. These olefin monomers may be polymerized alone or may be co-polymerized with diolefins or with mixtures of two or more mono-olefins. Preferred feedstocks are the 1-alkene hydrocarbons containing from 2 to 8 carbon atoms, inclusive, per molecule; those which contain 2 to 4 carbon atoms, inclusive, are most commercially attractive now. Suitable feedstocks include ethylene, propylene, 1-butene, 1-pentene, 1-heptene, 1-octene, 1-dodecene, 1- tetradecene, 1-hexadecene or the like. Examples of isoalkyl ethylenes which can be used as components of polymerization feedstocks are 3-methyl butene, 4-methyl pentene, 5-methyl hexene or their mixtures with each other or with normal 1-alkenes or the like.

The inventive system, as will appear hereinafter, is especially useful in the preparation of homopolymers or copolymers of ethylene and propylene. It can readily be modified for the preparation of copolymers comprising a major amount of a 1-alkene and a 4–8 carbn atom conjugated diene such as butadiene, isoprene, chloroprene, piperylene, cyclopentadiene or the like. Other comonomers comprising a major amount of a 1-alkene and a 4–8 carbon atom conjugated diene such as butadiene, isoprene, chloroprene, piperylene, cyclopentadiene or the like. Other comonomers include tetrafluoroethylene, perfluorovinyl chloride or the like.

Solid polymerization catalysts suitable for polymerizing 1-alkenes have been described in patents and in the scientific literature. An excellent survey article is by Friedlander and Resnick and appears in "Advances in Petroleum Chemicals and Refining," volume I, Chapter 11, pages 527–570. These authors group the solid catalysts into four classifications: preformed transition metal elements or oxides on high surface area supports, typified by nickel on charcoal or chromia on silica-alumina; promoted transition oxide catalyst such as chromia-alumina promoted by an aluminum trialkyl; solid catalysts precipitated in situ from transition metal salts and organo metallics, such as titanium tetrachlorides plus aluminum trialkyls; and pretreated precipitated catalysts in combination with organo metallic compounds, illustrated by titanium trichloride (a precipitate formed by reacting $TiCl_4$ with aluminum alkyls) and aluminum trialkyl.

As examples of the preformed transition metal elements or oxides on high surface supports, there may be mentioned cobalt metal on charcoal, partially reduced molybdenum oxide or cobalt molybdenum on alumina or on titania or zirconia, chromia on silica alumina, or other elements or oxides in Groups IV, V, VI and VIII of the Mendeleev Periodic Table. These are preferably extended on the difficultly reducible metal oxides such as silica, alumina, magnesia, titania, zirconia, clays, etc., having surface areas in excess of about 100 square meters per gram.

The promoted metal oxide catalysts are oxides (including hydrated oxides) of one or more metals in Groups IV, V and VI of the Periodic Table, promoted by elements, hydrides (including complex hydrides such as $NaBH_4$), and organo metallic compounds (including the sesquihalides) of non-transition metals and non-metals in Groups I, II and III of the Periodic Table. These promoters include elements or compounds of Li, Na, K, Rb, Cs, Be, Mg, Ca, Sn, Ba, B, Bi, etc. Hydrocarbon aluminum compounds, in which an aluminum atom is connected to one or more hydrocarbon radicals, are outstanding promoters.

Precipitated solid catalysts are prepared by the interaction of compounds of Groups IV, V and VI metals with hydrocarbon derivatives, such as alkyls, aryls, and sesquihalides of aluminum, magnesium, or zinc, or with Group I metal alkyls, and include the chlorides such as titanium chlorides, the oxy chlorides such as $VOCl_3$, and the acetylacetonates. The so-called Ziegler catalysts, the most active of which are prepared from titanium tetrachloride and aluminum trialkyls, are within the group.

Pretreated precipitated catalysts are generally found among the halides of transition metals of Groups IV, V and VI reduced to a sub-maximum valence state, in combination with an active co-catalyst such as the elements, hydrides (including complex hydrides) and organo metallic compounds of Groups I, II and III. The preferred catalyst combination is titanium trichloride with aluminum triethyl.

The foregoing enumeration includes a selected list of some of the very numerous solid catalysts which are useful in preparing normally solid olefin polymers which may be recovered and purified in accordance with the present invention. It will be understood, however, that no claim is being made per se as to the novelty of the catalysts as many of these are well known in the art, and new solid catalysts are constantly being developed.

A substantially inert liquid hydrocarbon reaction medium is employed in the polymerization. This liquid is preferably a normally liquid saturated aliphatic hydrocarbon such as a $C_{10}$–$C_{12}$ alkane fraction but can be a relatively unreactive alkene (containing a non-terminal double bond) or in some instances, a cycloalkene. An extensive listing of suitable hydrocarbon reaction media which are liquid at polymerization conditions and which are sufficiently inert so as not to substantially interfere with the polymerization reaction or deleteriously affect product quality are listed in Field et al. U.S. Patent 2,691,647. A very convenient hydrocarbon reaction medium is a material commercially termed "odorless mineral spirit," which is a highly acid treated petroleum naphtha consisting essentially of paraffins and having a boiling range of about 350–410° F.

Polymerization conditions may vary over wide limits, depending upon the inherent activity of the catalyst system and of the 1-alkene monomer or comonomer. It is only necessary for the purposes of the invention that conditions be so selected that the polymer is produced as a solution in a solvent comprising the liquid hydrocarbon reaction medium and excess 1-alkene monomer. Thus, temperatures within the range of about 200–650° F., preferably 400–550° F. may suitably be employed, although temperatures outside these ranges are occasionally found useful. Pressures may vary from atmospheric or even subatmospheric, e.g. 100 millimeters mercury absolute, to pressures of 30,000 pounds per square inch or more, preferably from 500 to about 1,000 pounds per square inch. These conditions are frequently termed "solution polymerization conditions" since the polymer is in the form of a homogeneous solution or gel with the reaction medium and excess 1-alkene.

Proportions of catalyst, reaction medium, and olefin are not critical, and may vary over exceedingly wide ranges. The proportions of catalyst (including high surface support, if any) based on the weight of 1-alkene feedstock can range from about 0.2 weight percent to 20 weight percent or even more; if a promoter or co-catalyst is employed, this may be used in ranges of from 100:1 to 1:100 moles per mole of transition metal compound catalyst. The concentration of 1-alkene monomer in the hydrocarbon reaction medium depends on such factors as solubility, pressure, and temperature, and may range from less than 1 weight percent to 50 weight percent or more. Ordinarily, it is preferred to continue polymerization for sufficient time such that the resultant solid polymer will be present in the reaction mixture at a concentration of between 3 to about 50 weight percent, more preferably about 5 to about 25, and most desirably about 15 to about 25 weight percent on a total solution basis.

Referring to the drawing, a schematic process flowsheet is shown for a plant producing 60 million pounds per year of polyethylene from a highly purified ethylene charging stock, using sodium metal-promoted molybdena-on-alumina catalyst and an odorless mineral spirits reaction medium.

The molybdena alumina catalyst before use is introduced via line 1 to catalyst reducer 11 where it is calcined with air and reduced with hydrogen at a temperature within the range of about 600–1500° F., e.g. 1,000 °F. The catalyst consists of approximately 10 weight percent $MoO_3$ on gamma $Al_2O_3$, obtained as a fine white powder having an average particle size of 50–60 microns. Hydrogen gas for reduction and nitrogen gas for purging are admitted to catalyst reducer 11 via lines 27 and 26, respectively, while air for calcination is blown in through line 28. Reduced catalyst is then transferred via line 12 to catalyst slurry tank 17, where a slurry is prepared of catalytically effective amounts of catalyst, 10,200 pounds per day of solvent, and effective amounts, within the foregoing ranges, of finely dispersed sodium metal promoter or sodium hydride, which is introduced to catalyst slurry tank 17 via line 2 and disperser 16. Catalyst slurry tank 17 is equipped with heating jacket 17a and agitator mechanism such as rotary stirrer 17b. Substantially inert hydrocarbon reaction medium is introduced via line 30 which results in a 15 weight percent slurry of catalyst and promoter in reaction medium which is withdrawn via line 3.

Ethylene monomer for use herein must be of exceedingly high purity. The ethylene is suitably purified to be substantially free from oxygen and sulfur compounds (less than 50 and preferably less than 5 parts per million), and should have a moisture content corresponding to a dew point below minus 50° F. It should contain not more than about 5 p.p.m. each of $CO$ and $CO_2$.

Ethylene is introduced on pressure control via line 4 at a rate of 8040 pounds per hour, and is combined with recycle ethylene from line 9 and conducted via line 21 to caustic scrubber 15 for acid gas removal. Caustic scrubber 15 may be a packed tower wherein a stream of 1–20 weight percent aqueous sodium hydroxide is continuously pumped via line 25, while fresh caustic is added from line 13 and caustic-containing absorbed hydrogen sulfide and carbon dioxide is discharged through line 22. (The combined ethylene feed in line 21 consists of about 11,320 pounds per hour of ethylene, of which 8,040 pounds per hour is fresh ethylene and 3,280 pounds is recycle ethylene.)

After caustic scrubbing, the ethylene is transferred through line 78 to dryer 79, which may be packed with alumina or similar water adsorptive agent for removal of traces of moisture. Ethylene leaving dryer 79 through line 80 is compressed via compressor 81 to about 1500 p.s.i.g. and transmitted to surge tank 82, from which it is valved into polymerization reactor 19 on pressure control. Condensed hydrocarbon reaction medium is collected and released via line 33.

For the exemplified polymerization, ethylene is polymerized batchwise in reactor 19 at about 500° F. and a pressure of about 1,000 p.s.i.g. Continuous, batch or intermitten polymerization may be employed as desired, however. Reactor 19 is equipped with a jacket 19a and may have cooling coils or cooling baffles therein for the purpose of removing the exothermic heat of polymerization. Most of the heat of reaction may be removed by condensing and refluxing the boiling reaction medium. It also contains an agitator such as stirrer 19b. On an average, the charge to reactor 19 consists of about 11,320 pounds per hour of ethylene monomer, a slurry of 1,320 pounds per hour of solvent, effective amounts of catalyst and of dispersed sodium metal promoter, and 28,000 pounds per hour of fresh hydrocarbon reaction medium introduced via line 39.

Ethylene is added continuously to maintain the 1,000 p.s.i.g. reactor pressure.

At the conclusion of reaction, the reaction mixture consists of a homogeneous solution of about 7,600 pounds per hour of polyethylene in 30,400 pounds per hour of hydrocarbon reaction medium and 3,720 pounds per hour of excess unreacted ethylene, together with the finely divided catalyst and dispersed promoter. The solution thus contains about 18 weight percent of normally solid polyethylene material.

This reaction mixture is flashed from reactor 19 across pressure control valve 5a into flash drum 23, where most of the unreacted ethylene is removed. Flash drum 23 may be operated at a slight superatmospheric pressure, e.g., 1–50 p.s.i.g., for example, 5 p.s.i.g., and at a temperature of about 385° F. to guard against possible infiltration of air which may cause product discoloration. A heating jacket 23a, and an agitator 23b are desirably provided to insure more effective olefin flashing. Vapors of ethylene and hydrocarbon reaction medium pass through line 34 to a condenser 34a, where most of the liquid hydrocarbon medium is condensed and returned via line 35 to flash drum 23, while the unreacted ethylene is conducted via line 9 to recycle ethylene compressor line 77, from whence it is returned via line 9 to the ethylene purification system and ultimately to reactor 19.

The bottoms material in flash drum 23 in a liquid mixture containing all of the olefin polymer, substantially all of the solvent, and substantially all of the catalyst and promoter. Its composition is approximately 30,400 pounds per hour of liquid hydrocarbon reaction medium, 7,600 pounds per hour of dissolved solid polyethylene, and catalyst and sodium promoter. It also contains about 24 pounds per hour of dissolved ethylene. Thus almost all of the bottoms material is either normally liquid or normally solid, and flashing of olefin monomer in subsequent processing steps is avoided. It is pumped via line 6 to filter 24.

Filter 24, or an equivalent solids-liquid phase separator such as a centrifuge or a hydrocyclone is adapted to separate the solid catalyst and solid promoter (Na) from the solution mixture of olefin polymer and hydrocarbon reaction medium. It has been found that a conventional plate and frame filter press, employing filter media such as laboratory cellulosic-type filter paper and a diatomaceous filter aid is exceedingly effective in removing even the last trace of solid catalyst from such solutions. A suitable filter paper is the resin-impregnated Eaton-Dikeman No. 928–95. Accordingly, the filtered catalyst is manually discharged and discarded via line 8, while the filtrate comprising a mixture of normally solid polymer and hydrocarbon reaction medium is withdrawn via line 18. If desired, the metal oxide catalyst may be recovered and recycled, as by roasting at 600–1200° F. to remove carbonaceous material, followed by hydrogen reduction at the same temperatures to restore a desirable valence state.

At this point in the polymer recovery, a small amount of oxidation inhibitor may be added via line 14. Oxidation inhibitors are obtainable in a wide variety of types and are well-known commercial products.

The filtrate is stored in feed tank 29, from which it is pumped via line 7 through cooler 32 where it is cooled to a temperature just above its precipitation temperature. The cooled mixture is fed to a high pressure die feed pump 37. Pump 37 is desirably of the positive displacement type and is adapted to force the very viscous solvent-polymer mixture through a solution die 38 which forms it into an extrudate with increased available surface area. Extrusion dies 38 may be in any suitable form and may produce the extrudate with any desirable cross-sectional configuration, for example, round, square, cruciform, or hollow tubular strands or sheets.

For convenience and ease of handling, the extrudate is quenched or cooled by direct contact with water in cooling trough 40. Cooling or quenching trough 40 may be a horizontal trough, but is preferably a vertically elongated tank in which the strands or extrudate are formed at the bottom thereof and permitted to float to the top. Such floating is possible because both polyethylene and the hydrocarbon reaction medium have lower densities than water. The foregoing operation can also be carried out in a centrifugal pump quencher where the melt is introduced through the pump casing and water is introduced through the pump suction. The open impeller of the pump chops the incoming melt into pellets which are swept away as a slurry in water through the pump discharge. Such a device is described in U.S. 3,070,835—Alsys, issued Jan. 1, 1963.

The strands or sheets are picked up and chopped into cylindrical pellets or crosscut into cubes by means of a chopper assembly 42 which may include a blade-like chopping device or similar apparatus to cut the extrudate into short lengths. When a centrifugal pump quencher is used, the extruded mixture of solvent and polymer generally requires no additional chopping. The extrudate is then transferred to steam still 43.

Steam still 43 is an agitated vessel which may be operated under pressure or vacuum. The vessel normally contains a free water phase. Steam is directly introduced via line 36 for the purpose of stripping out hydrocarbon reaction medium from the extrudate. For polyethylene stripping, steam at about 212° F. is admitted via line 36 at a rate sufficient to remove substantially all of the hydrocarbon reaction medium. For copolymer processing, the stripping operation is carried out under vacuum in order to keep the temperature of the contents below 160–170° F. and prevent agglomeration and melting of the copolymer charge. The steam rate is determined with reference to the concentration of reaction medium in the extrudate, the temperature and pressure of the inlet steam, and the extent of solvent removal which is desired. Suitable steam rates may range from about 1 to about 10 pounds of steam per pound of dry polymer in the extrudate per hour, preferably from about 1.5 to about 3.5, and most desirably between about 2 to about 3 pounds of steam per pound of extrudate per hour. Steam stripping is usable on even the lowest melting polymers, and may also be employed with full satisfaction with amorphous polymers which are incapable of ready purification by any other means.

As noted previously, vacuum steam stripping is frequently desirable and often necessary. Ethylene homopolymers, depending on their melt indices, have VICAT softening points of the order of 118–126° C. When these polymers contain 80% by weight of mineral spirits, their softening temperature drops 16–18° C. to slightly above 100° C. Copolymers, on the other hand, have softening temperatures in the pure state of less than 98° C. Thus, vacuums of 1.0–700 mm. Hg may be used in these cases.

The vaporized mixture of steam and hydrocarbon reaction medium is withdrawn from steam still 43 by way of vapor line 44, condensed in condenser 45, and transferred via line 10 to a solvent purification system which will be described presently.

Meanwhile, the steam stripped extrudate is transferred to dump tank 46 and thence via line 41 to centrifuge 48 for the purpose of removing gross amounts of water. Water is released through line 49, while the semi-dry polymer extrudate is transferred via line 50 to polymer dryer line 51. In polymer dryer 51 a heated stream of air or other inert gas is passed over the polymer to reduce the water content of the polymer down to about 1–2 weight percent or less. Dryer 51 may be a continuous or batch dryer, preferably of the kiln type which assures intimate mass transfer between the heated gas and the polymer.

Polymer product from dryer 51 is of exceedingly high purity and water white in color. It contains less than 0.1 weight percent catalyst, and essentially no solvent. In this form it may be sold as a commercial material, without further purification or treatment. If, however, it is to be shipped for any considerable distance, its low density may unfavorably increase the polymer bulk, and accordingly it may be desirable to re-extrude the polymer and form a dense compacted polymer. For this purpose, screw extruder 55 may be employed. It may be a conventional vented single or double screw extruder having an atmospheric or vacuum vent 56 to remove the last traces of moisture. The extrudate is cooled in water-filled trough 57, chopped by chopper 58, and then transferred to packaging facilities not shown.

Returning now to the solvent purification system, the condensed mixture of liquid hydrocarbon reaction medium and water obtained from steam still 43 is transferred via line 10 to solvent distillation towers 60 and 66. In tower 60, which may be a fractionating column having a series of distillation plates or trays, low boiling materials and water are distilled overhead via vapor line 61, condensed in condenser 62, and transferred to decanter 63. Water separates as a heavy bottom layer and is discarded via line 63a, while most of the hydrocarbon is refluxed to tower 60 via line 64. A portion of the light hydrocarbon, which boils lower than the desired initial boiling point of the reaction medium, is vented through line 63b.

The bottoms from tower 60 is transferred via line 65 to the second distillation tower 66 in the system. In this tower, which similarly may have fractional distillation trays or plates, high boiling components are taken off as a bottoms discard product through line 70a, while the major amount of reaction medium is taken overhead via line 67, over condenser line 68 and reflux drum 69 as a heart cut of the system.

The heart cut reaction medium is pumped via line 70 through cooler 71 and thence at a temperature approximating 100° F. to a drying vessel 72.

Vessel 72 is packed with a zeolite or "molecular sieve" material, which is a calcium aluminosilicate, having a pore size of approximately 5 Angstroms and which has a tenacious affinity for water. Two or more vessels 72 are desirably employed, with suitable manifolding not shown, so that while one is onstream, the other may be taken off stream and regenerated by heating to temperatures above about 500° F. with passage of an inert purge gas through the sieve material. Heating may be accomplished by any suitable means, such as preheating the purge gas or by passing Dowtherm or other heat transfer agent through coils embedded in the molecular sieve bed.

The dry heart cut reaction medium is then conducted through line 73 to a silica gel bed 74. Bed 74 may be packed with conventional silica gel particles which have the ability of removing undesirable contaminants such as oxygenated organics or similar compounds which previously defied separation by distillation or adsorption by the molecular sieve bed. It has been found experimentally that the combination of distillation to obtain a heart cut, the passage through a molecular sieve bed, and silica gel contacting affords a regenerated hydrocarbon reaction medium which is fully as suitable as the best quality reaction media obtainable by using pure hydrocarbon components. The order of molecular sieve and silica gel treatment may be reversed if desired.

The regenerated solvent or reaction media is pumped via line 75 and preheater 76 to serve as a reaction medium (line 39) and in making up the catalyst-promoter slurry (line 30).

From the foregoing description, it is evident that there has been provided in accordance with the invention an integrated and highly simplified process for preparing high quality normally solid olefin polymers. Merely by conducting the polymerization using a solid polymerization catalyst and in the presence of a substantially inert reaction medium, flashing the reaction mixture to separate unreacter 1-alkene monomer, filtering the flashed material to remove solid catalyst, followed by extruding, steam-stripping, and drying of the catalyst-free filtrate, a high quality commercially-acceptable polymer may be produced. In contrast to many of the prior art processes, the instant process is exceedingly simple, versatile, and features reduced investment and operating costs. Also, means are provided for purifying and recycling the unreacted 1-alkene monomer and the liquid hydrocarbon reaction medium.

A special advantage of the instant process is that it may be employed in the preparation of various copolymers of ethylene or propylene with each other or with conjugated dienes. These copolymers are relatively soluble in low boiling paraffinic solvents such as hexane or heptane which have heretofore been proposed for purifying ethylene homopolymers. Thus a plant in accordance with the instant defined process is suitable not only for manufacturing ethylene homopolymers, but can, with little modification except with the inclusion of additional olefin purification and charging facilities, produce any one or more of the commercially valuable copolymers.

While the invention has been described with reference to a particular embodiment thereof, it will be apparent that this is by way of illustration only. Accordingly, modifications and variations will be evident to those skilled in the art, and it is intended to embrace all such modifications and variations as fall within the spirit and broad scope of the appended claims.

We claim:

1. In a process wherein a 1-alkene monomer is polymerized in the presence of a solid polymerization catalyst and a substantially inert liquid hydrocarbon reaction medium under polymerization conditions, including a temperature within the range of about 200 to about 650° F., to produce a normally solid olefin polymer dissolved in said medium, the improved method of recovering said polymer, from a mixture of said monomer, said catalyst, said polymer and said medium, consisting of sequential operations as follows:
    (a) flashing said mixture to separate a major portion of said monomer;
    (b) physically separating said catalyst from a solution of said polymer in said medium;
    (c) cooling said solution to a temperature just above precipitation temperature;
    (d) extruding said cooled solution into water, to produce an admixture of a solid extrudate, having the same composition as said solution, with water; and,
    (e) steam-stripping said admixture to remove residual medium from said extrudate and produce said polymer in solid form.

2. Process of claim 1 wherein said 1-alkene monomer is ethylene.

3. Process of claim 1 wherein said 1-alkene monomer is propylene.

4. Process of claim 1 wherein said 1-alkene monomer is a mixture of ethylene and propylene.

5. Process of claim 1 wherein said finely divided solid polymerization catalyst is selected from the group consisting of elements and compounds of transition metals in Groups IV, V, VI and VIII of the Mendeleev Periodic Table on a high surface support.

6. Process of claim 1 wherein said substantially inert liquid hydrocarbon reaction medium is an acid treated mineral spirit.

7. Process of claim 1 wherein said physical separation of the finely divided solid polymerization catalyst is accomplished by filtration.

8. Process of claim 1 including the additional steps of drying, melting, and re-extruding said polymer.

References Cited

UNITED STATES PATENTS

| | | | |
|---|---|---|---|
| 2,964,513 | 8/1956 | Dale | 260—94.9 |
| 3,072,626 | 1/1963 | Cines | 260—93.7 |
| 3,244,688 | 4/1966 | Goins | 260—94.9 |

JOSEPH L. SCHOFER, *Primary Examiner.*

LAWRENCE EDELMAN, *Assistant Examiner.*